Figure 2:
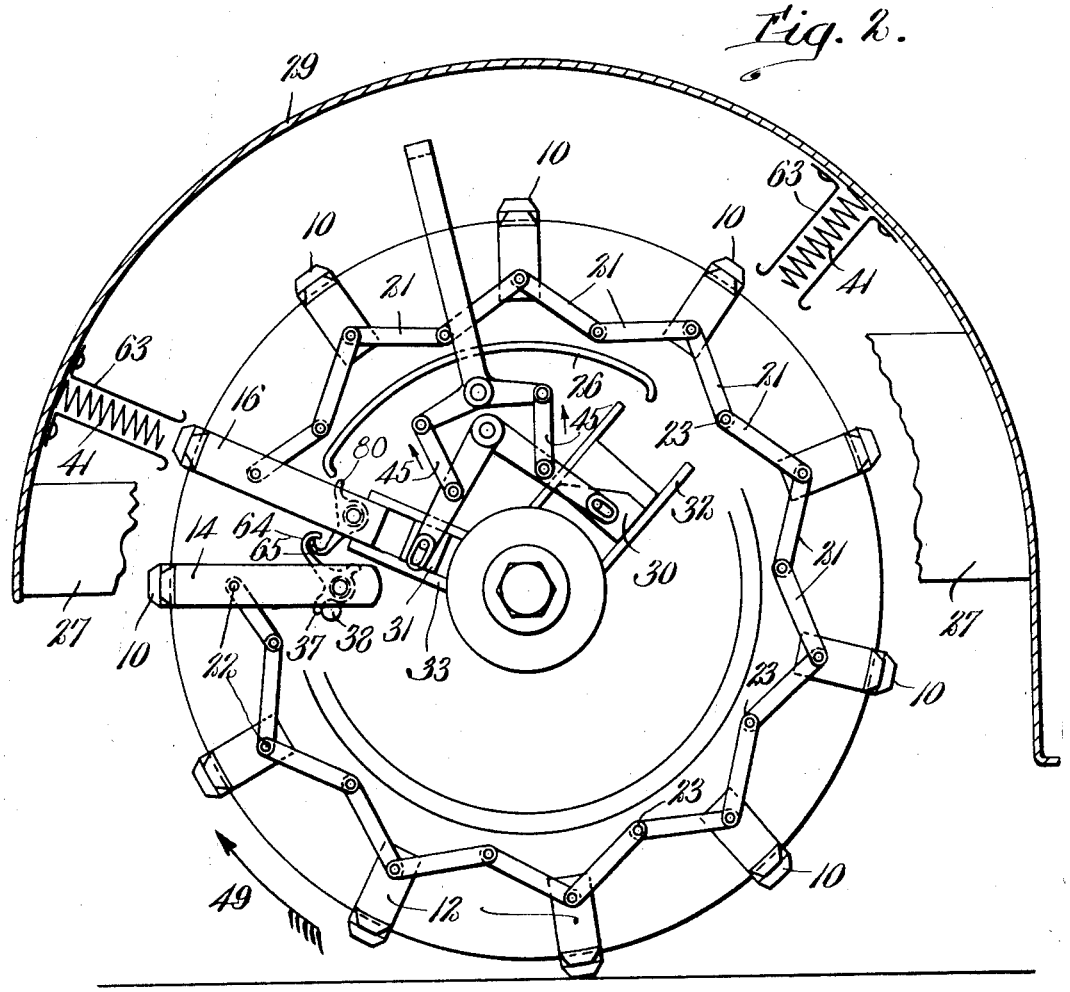

Dec. 19, 1933.  L. B. ERWIN  1,939,771

ANTISKID DEVICE

Filed May 4, 1932  3 Sheets-Sheet 1

Fig. 1.

Fig. 3.

Inventor.
Lawrence B. Erwin
by J. Stanley Churchill
att'y.

Dec. 19, 1933.　　　L. B. ERWIN　　　1,939,771
ANTISKID DEVICE
Filed May 4, 1932　　　3 Sheets-Sheet 2

Inventor:
Lawrence B. Erwin
by J. Stanley Churchill
Atty.

Dec. 19, 1933.   L. B. ERWIN   1,939,771
ANTISKID DEVICE
Filed May 4, 1932   3 Sheets-Sheet 3
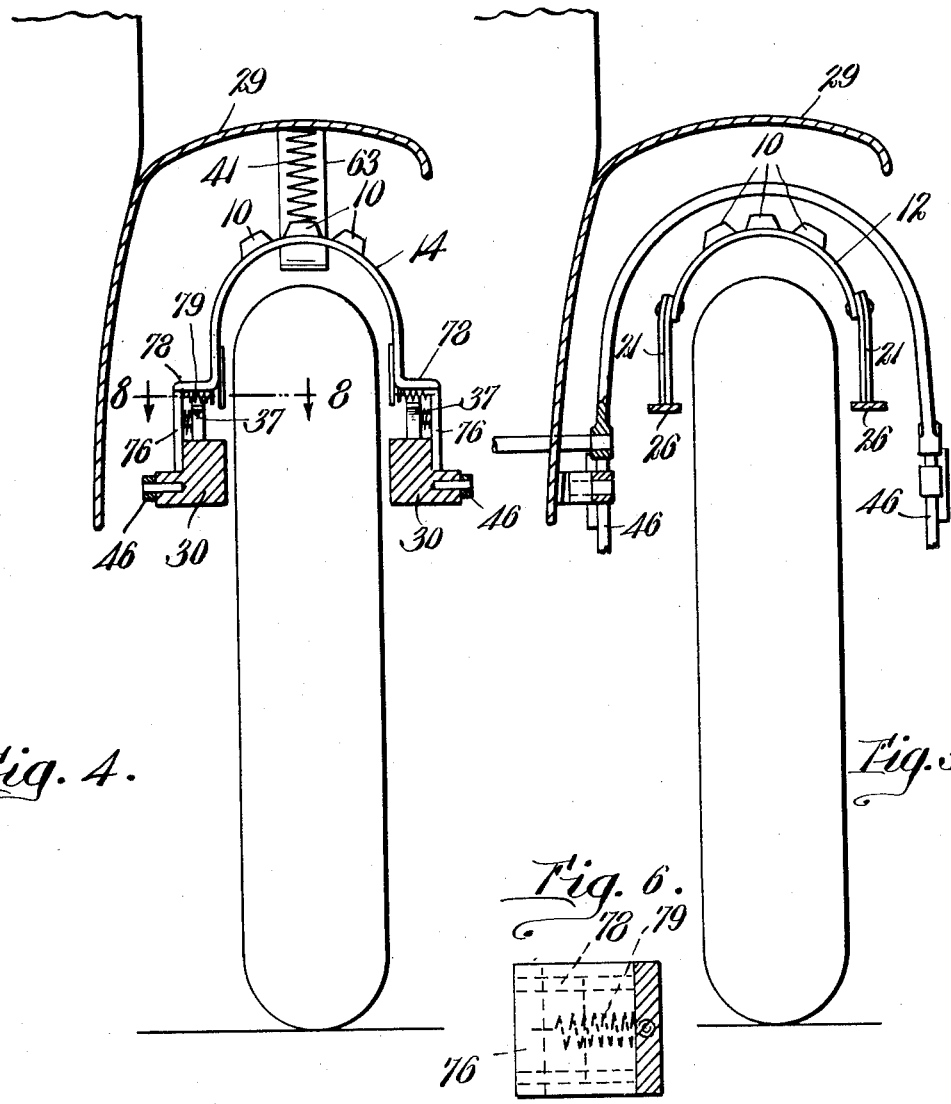
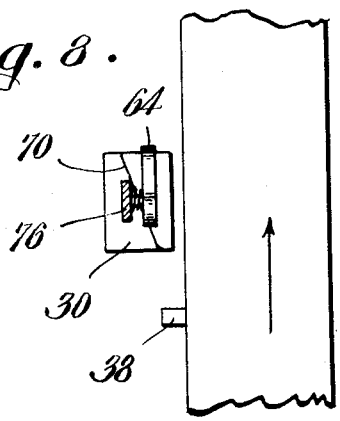

Patented Dec. 19, 1933

1,939,771

UNITED STATES PATENT OFFICE 1,939,771

ANTISKID DEVICE

Lawrence B. Erwin, Marblehead, Mass.

Application May 4, 1932. Serial No. 609,210

6 Claims. (Cl. 152—14)

This invention relates to an anti-skid device for motor vehicles and to mechanism for automatically applying and removing the same.

The object of the invention is to provide a novel and improved anti-skid device and mechanism for automatically applying and removing the same from the tire of a motor vehicle, which is positive in operation and may be applied during forward or rearward motion of the vehicle, and when not in use may be carried in an inoperative position above the tire.

With this object in view, and such others as may hereinafter appear, the invention consists in the anti-skid device and mechanism for applying and removing the same, hereinafter described and particularly defined in the claims at the end of this specification.

In the drawings illustrating the preferred embodiment of the invention, Fig. 1 illustrates in side elevation one of the rear wheels of the motor vehicle equipped with the present anti-skid device and applying mechanism, illustrating the device in its inoperative position; Fig. 2 is a similar view illustrating the device applied to the tire; Fig. 3 is a diagrammatic view of a portion of the operating mechanism for effecting the application and removal of the anti-skid device to and from the tire; Fig. 4 is a section on the line 4—4 of Fig. 1; Fig. 5 is a similar view on the line 5—5 of Fig. 1; Fig. 6 is a section on the line 6—6 of Fig. 7; Fig. 7 is a detail in elevation to be referred to; and Fig. 8 is a sectional plan taken on the line 8—8 of Fig. 4.

In general, the present invention contemplates a novel anti-skid device including a plurality of individual anti-skid members, capable of application to a tire. Each anti-skid device preferably comprises a plurality of rubber blocks 10 affixed to a metal strap 12 curved to be capable of being positioned over the tire in the manner illustrated in Figs. 2, 4 and 5. A sufficient number of such anti-skid devices are provided so that when the devices are applied to the tire as illustrated in Fig. 2, they will be spaced at desired intervals around the periphery of the tire. The straps 12 of the two end anti-skid devices 14, 16 are elongated to cooperate with mechanism, as will be described, for applying them and the remaining anti-skid devices to the tire and for effecting the removal of the same. The anti-skid devices are connected to one another by a series of levers 21 pivoted at 22 to the straps 12, and each adjacent pair of levers are pivoted together as at 23.

In their inoperative position, all of the anti- skid devices with the exception of the end devices 14, 16 are supported in an elevated position removed from the tire, by arcuate supports or bars 26 secured in any convenient manner, not shown, to cross bars 27 carried by the fender 29 and located upon opposite sides of the tire. The lower pivoted ends 23 of the series of levers 21 rest upon these arcuate supports to sustain the anti-skid devices in their inoperative or elevated position. The end anti-skid members 14, 16 are supported in elevated or inoperative position by actuating blocks 30, 31, operating in guides 32, 33, which are stationary and may be affixed in any convenient manner (not shown) to the cross bars 27. The end members 14, 16 cooperate with portions of the blocks 30, 31 which extend laterally beyond the planes of the guides 32, 33 so as to permit the end members to move from the blocks when the end members revolve with the wheel.

Provision is made for manually lowering the actuating blocks 30, 31 in order to position the end anti-skid members in a position in which a hook 37 may be engaged by a pin 38 upon the wheel of the motor vehicle to thereafter rotate the end anti-skid member 14 with the tire, and through the pivoted levers 21 such motion is utilized to effect movement of succeeding anti-skid devices down into engagement with the tire and into their properly spaced relation shown in Fig. 2. For this purpose the motor vehicle is provided with an operating handle 40 pivoted to the same in a position convenient for operation from the driving seat of the motor vehicle. The handle 40 is connected by a link 42 to one arm of a bell crank 43, pivoted to a three-arm lever 44, the latter being connected by pivoted parallel links 45 to a pair of block operating levers 46, 47 pivotally connected to the blocks 30, 31 respectively. This mechanism is illustrated in detail in Fig. 3.

In the application of the anti-skid device to the wheel, assuming the vehicle to be in forward motion as indicated by the arrow 49, the operating handle 40, Fig. 3, is moved in the direction of the arrow 50 operating to depress the sliding blocks 30, 31 in their guides into the position shown in Fig. 2. When the slide blocks are dropped, both end anti-skid members 14, 16 drop into the position shown in Fig. 2. This positions the hook 37 which is pivotally carried by the end anti-skid member 14 in the path of the pin 38 projecting from the wheel, so that during the rotation of the wheel in a clockwise direction, as indicated by the arrow 49, upon the forward movement of the vehicle, the pin 38 engages the hook 37 and operates during continued rotation of the wheel to cause the end member 14 to move with the wheel, the block 30 being designed to permit the end member 14 to be moved free of the same, so that thereafter the weight of the parts, together with the pressure of the pin upon the hook operates to cause the end anti-skid device to be brought into firm engagement with the tire. Continued movement of the end member 14 with the tire and wheel operates through the series of pivoted levers 21 to draw successive anti-skid devices into their properly spaced positions and into engagement with the tire, as illustrated in Fig. 2.

The second end anti-skid member 16 is free to be moved downwardly by the spring 41 after the sliding block has been moved into the position shown in Fig. 2 by the above-described operation of the handle 40, and in which the anti-skid device 16 is retained by the ends of the spring clamps 63 in a position slightly off the tire until such time during the application of the anti-skid devices as the lever 24 pulls the last anti-skid device 16 down onto the tire. About this time the hook 64 will be in a position to engage and lock with a hook 65 upon the first end anti-skid member 14, thus completing the operation of applying and locking the anti-skid devices to the tire.

The application of the anti-skid devices by the forward movement of the vehicle is as above described. When it is desired to apply the anti-skid devices by movement of the vehicle in the reverse direction, the application of the anti-skid devices is effected in the reverse manner, the first movement being to move the handle 40 in the direction of the arrow 50 to position the end members 14, 16 slightly off the tire and in such position that the hook 80 is engaged by the pin 38 during movement of the wheel in the direction reverse to that indicated by the arrow 49.

After the hook 80 has been engaged by the pin 38, the movement of the wheel pulls down the second end member 16 of the anti-skid devices from its position where it is held by the end of the spring clamp 63 to cause it to engage the tire and to move with the wheel, operating to pull successive of the anti-skid devices from their position on the arcuate support 26 down onto the tire in properly spaced relation. The guides 33 and the end member 16 occupy different planes so that the rotation of the end member with the wheel is made possible. After the end member 16 is revolved with the wheel, the hook 65 is brought into engagement with the hook 64, thus completing the application and locking of the anti-skid devices upon the wheel.

In the illustrated device provision is made for automatically effecting the detachment of the anti-skid devices from the tire and wheel and for restoring them to their inoperative position shown in Fig. 1, and for this purpose the forward movement of the vehicle is utilized.

In order to unlock the anti-skid devices from the tire and wheel the handle 40 is pushed in a direction reverse to the arrow 50 into an intermediate position such as is illustrated by the dotted lines in Fig. 3, sufficient to elevate the block 30 into the path of the end of the end member 14 of the anti-skid devices. The second block 31 however is not moved into a position such as to disengage the end member 16 from the tire. As the wheel starts to revolve in a forward direction, the member 14 is lifted sufficiently by the block 30 to cause the anti-skid device to project into the spring clip and to be held stationary thereby. Thereafter, as the wheel continues to move forward, the end member 14 remaining stationary, operates through the pivoted levers 21 to lift succeeding anti-skid devices from the tire and to assemble the series in their inoperative position shown in Fig. 1, the lower ends of the levers resting upon the arcuate support 26. When the tire has revolved sufficiently, the second end member 16 is raised by its lever into engagement with its spring clip 3. The handle 40 is then moved into its final position shown in Fig. 3, operating to lift the two blocks 30, 31 and to cause the complete upward movement of the members 14 and 16 into their spring clips, and effecting the compression of the springs 41, the parts being in the position shown in Fig. 1.

The spring clips are rounded, and the top of the anti-skid devices are preferably tapered to assist in locating the parts when the anti-skid devices are to be introduced into the spring clips.

During the initial portion of the wheel movement in unlocking the anti-skid devices, a vertical cam surface 70 upon the block 30 is utilized for forcing the hook 64 laterally and outwardly away from the pin 38 in order to disengage the same from the pin, the parts assuming the relative position shown in Fig. 8. In order to facilitate this outward movement the vertical portion 76 of the end member is connected by a slidable connection 78 and spring 79, as illustrated in detail in Figs. 4, 6 and 7.

From the above description it will be observed that in accordance with the present invention the anti-skid devices may be automatically applied to the wheels of the vehicle, utilizing either forward or rearward motion in effecting their application and that in the illustrated form of the invention the forward movement of the vehicle is utilized in unlocking and removing the anti-skid devices from the tire and wheel. The mechanism preferably includes the pivoted levers 21 arranged to effect the movement of the remaining anti-skid devices both onto and off from the operative position on the tire, after the first end anti-skid member has been in the manner above described applied to or removed from the tire by the rotary movement of the vehicle wheel. In this manner positive and efficient operation is secured.

While the preferred embodiments of the invention have been herein illustrated and described, it will be understood that the invention may be embodied in other forms within the scope of the following claims.

Having thus described the invention, what is claimed is:—

1. The combination with the wheel of a motor vehicle, of a plurality of anti-skid devices therefor, means for supporting said devices in relatively closely spaced relation in an inoperative position above the tire, and applying means for effecting the application of said anti-skid devices through rotary movement of the wheel in either direction and means for effecting removal of said anti-skid devices from the tire, both of said means including means for first effecting movement of the end anti-skid members, and pairs of levers, each pair being pivotally connected together and to adjacent anti-skid members and by which successive movements of successive anti-skid members are effected upon rotation of the wheel.

2. The combination with the wheel of a motor vehicle, of a plurality of anti-skid devices therefor, means for supporting said devices in relatively closely spaced relation in an inoperative position above the tire, and applying mechanism for effecting the application of said anti-skid devices through rotary movement of the wheel in either direction and means for effecting removal of said anti-skid devices from the tire, both of said means including manually operated means for first effecting movement of the end anti-skid members, and pairs of levers, each pair being pivotally connected together and to adjacent anti-skid members and by which successive movements of successive anti-skid members are effected upon rotation of the wheel.

3. The combination with the wheel of a motor vehicle, of a plurality of anti-skid devices therefor, a pair of pivoted levers connected to adjacent anti-skid devices, manually operated mechanism cooperating with the end anti-skid devices to selectively position them with relation to the vehicle wheel, and cooperating means upon said end anti-skid devices and said wheel for effecting the rotation of one of said end anti-skid members with said wheel upon rotation of the wheel in either direction.

4. The combination with the wheel of a motor vehicle, of a plurality of anti-skid devices therefor, a series of pairs of pivoted levers connecting adjacent anti-skid devices, manually operated means for controlling the movement of the end anti-skid devices toward and from the tire, and means for effecting rotation of one of the end anti-skid devices with the tire after it has been positioned thereon to effect the application of the remaining anti-skid devices to the tire upon rotation in either direction.

5. The combination with the wheel of a motor vehicle, of a plurality of anti-skid devices therefor, a series of pairs of pivoted levers connecting adjacent anti-skid devices, manually operated means for controlling the movement of the end anti-skid devices toward and from the tire, and means for effecting rotation of one of the end anti-skid devices with the tire after it has been positioned thereon to effect the application of the remaining anti-skid devices to the tire upon rotation in either direction, said means serving to effect disengagement of the end anti-skid device upon rotation of the wheel to thereby effect removal of all of the anti-skid devices from the tire.

6. The combination with the wheel of a motor vehicle, of a plurality of anti-skid devices therefor, means for supporting said devices in relatively closely spaced relation in an inoperative position above the tire, and applying mechanism for effecting through rotary movement of the wheel in either direction the application of said anti-skid devices to the tire including means for first effecting movement of the end anti-skid members, and connections between said end anti-skid member and the remaining anti-skid members, and means for locking the end anti-skid members together in operative position upon the tire after application thereto.

LAWRENCE B. ERWIN.